Jan. 22, 1952     L. G. SAYWELL     2,583,019
SEALING ASSEMBLY
Filed Sept. 6, 1947
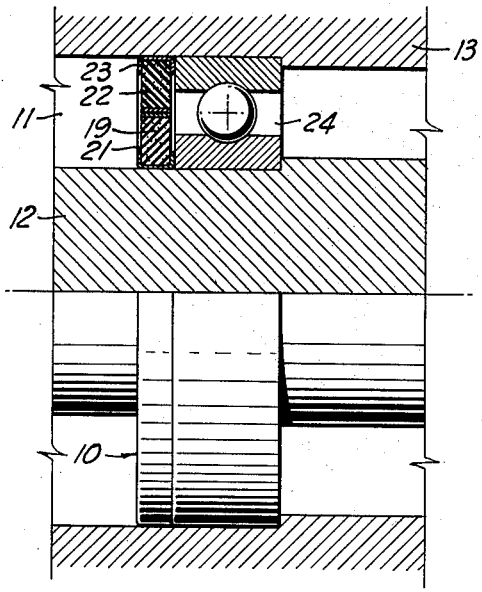
FIG_1_
FIG_3_
FIG_2_
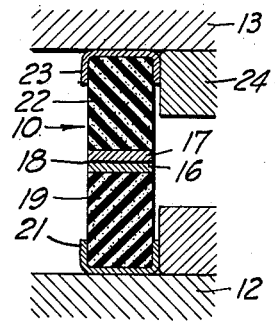
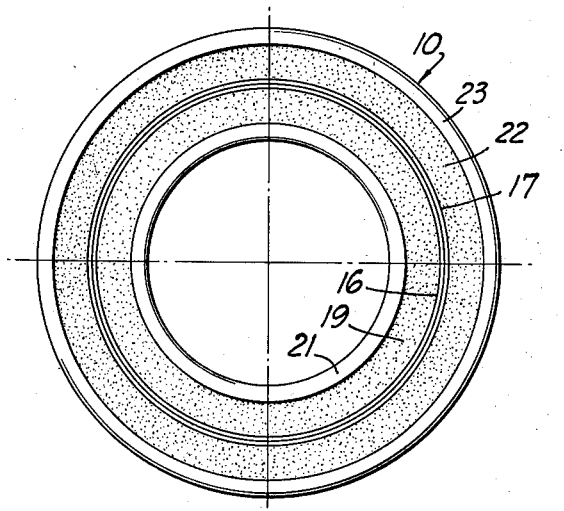
INVENTOR
Lawrence G. Saywell
BY
ATTORNEYS Patented Jan. 22, 1952

2,583,019

UNITED STATES PATENT OFFICE 2,583,019

SEALING ASSEMBLY

Lawrence G. Saywell, San Mateo, Calif., assignor to Saywell Associates, South San Francisco, Calif., a joint venture Application September 6, 1947, Serial No. 772,485

4 Claims. (Cl. 286—7)

This invention relates generally to assemblies or devices suitable for use with relatively rotatable parts to provide a fluid tight seal, and which in particular is applicable to bearings for preventing leakage of oil or grease.

It is an object of the invention to provide an improved sealing assembly of the above type which will be characterized particularly by the relatively small amount of friction which it offers to rotation.

It is a further object of the invention to provide a sealing assembly of the above character which is capable of accommodating a substantial amount or misalignment between the inner and outer relatively rotatable parts, and in which the friction offered to relative rotation remains substantially constant irrespective of different conditions of operation, including for example longitudinal movement of the shaft or like part being sealed, radial misalignment, or application of fluid pressure to one side of the seal.

A further object of the invention is to provide an effective sealing assembly which can be readily manufactured to high accuracy, and which can be assembled with a shaft to be sealed without danger of interfering with the accuracy of the sealing surfaces.

Additional objects of the invention will appear from the following description in which the preferred embodiment of the invention has been set forth in detail in conjunction with the accompanying drawing.

Referring to the drawing:

Figure 1 is a side elevational view, partly in section, showing a sealing assembly according to the present invention incorporated between a rotatable shaft and an outer bearing housing.

Figure 2 is an enlarged detail in section illustrating the construction of the assembly incorporated in Figure 1.

Figure 3 is a side view of the sealing assembly shown in Figures 1 and 2, removed from the shaft.

In Figure 1 of the drawing, my sealing assembly 10 is incorporated in the annular space 11 between the shaft 12 and the outer housing part 13. The assembly itself is illustrated in detail in Figures 2 and 3. It consists of a pair of interfitted metal rings 16 and 17, which have their peripheries in close apposition on the cylindrical sealing area 18.

In constructing the rings 16 and 17 I select suitable metals or metal alloys which can be accurately finished and closely fitted without danger of scoring. For example I can use relatively porous metal which can be impregnated with a suitable lubricant for one of the rings, and the other ring can be formed of suitable wear resistant metal such as a steel of proper hardness, or a suitable "stainless" steel or like alloy. Bodies formed by compressing powdered metal are satisfactory for the one ring, as for example bearing metal known by the tradename "Oilite." The outer and inner surfaces of the rings 16 and 17 should be given a highly accurate and smooth finish, as by grinding and burnishing, whereby the clearance is only sufficient for free relative turning when lubricated by a film of oil. For example where the rings have a mean diameter of the order of 1 inch, the clearance can be of the order of 0.0002 to 0.0005 inches, for rings ranging in width from ⅜ to 1 inch. When finished and interfitted in this manner, with an intervening film of oil, the engagement is relatively fluid tight as will be presently explained.

Means are provided for forming a resilient and fluid tight engagement between the inner ring 16 and the shaft 12, which in this instance can consist of an annulus 19 formed of suitable resilient material, such as resilient synthetic rubber. Cellular or sponge rubber is particularly desirable. The rubber is directly bonded to the inner periphery of the ring 16 and to a metal mounting ring 21, which is proportioned to have a pressed fluid tight fit upon the shaft 12. Ring 21 can be formed of suitable sheet metal with end flanges to engage the inner peripheral portion of the annulus 19.

The outer ring 17 is likewise bonded to a resilient annulus 22, which in turn is bonded to and carried by the metal mounting ring 23. This ring is proportioned to have a pressed fluid tight fit with the bore of the housing 13.

In Figure 1 the sealing assembly 10 has been positioned adjacent the ball bearing assembly 24 for the shaft 12. The purpose of the assembly in this instance is to prevent loss of oil or grease from the shaft bearing.

Assuming that the rings 16 and 17 are closely interfitted but relatively free running, it is evident that installation of the entire sealing assembly in the manner illustrated in Figure 1 cannot in any way apply mechanical stresses to the rings 16 and 17, which might distort the same and thus interfere with desired free relative rotation. Likewise if there is some misalignment between the shaft and the bore of the outer part 13, this misalignment is accommodated by the resilient annuluses 19 and 22.

When in use under running conditions a film of oil is always maintained between the rings 16 and 17, and because of the relative close tolerances and the smooth surfaces of the metal, an effective fluid seal is formed which prevents leakage of oil from the bearing. Any off center rotation of the shaft, or slight axial misalignment, is accommodated by the resilient annuluses 19 and 22, without in any way interfering with the smooth running fit between the rings 16 and 17, and without relatively increasing the friction between these parts. A considerable longitudinal movement of the shaft relative to the housing is accommodated by the assembly, since the rings 16 and 17 are free to move longitudinally of each other for a substantial distance, without interfering with the fluid seal between the same. In this connection it may be explained that the width of the rings 16 and 17, taken longitudinally of the axis of the shaft, should be such that for the clearances employed the rings have no tendency to cock relative to each other. Thus I have found for example that rings measuring from ⅜ to ½ an inch in width and with a mean diameter of about ½ to 1 inch, have no tendency to cock relative to each other where the clearance between the rings is of the order as previously specified.

It will be evident that my assembly can be readily manufactured without undue expense. Rings 16 and 17 can be accurately ground and burnished to the dimensions required, and following such finishing, they are bonded to the rubber annuluses 19 and 22.

It is a relatively simple matter to install my sealing assembly with a bearing. Generally the complete assembly can be forced in place with the mounting rings 21 and 23 in tight sealing engagement with the shaft and the housing 13. If desired however the mounting rings 21 and 23 with their associated parts, may be separately positioned within the bearing.

Instead of installing the assembly in proximity with a bearing, it can be used to form a closure or seal between relatively rotating and concentric parts, irrespective of the presence or location of the bearing assembly.

My assembly is self-lubricating to a marked degree because of the lubricant which can be stored in the porous metal. In addition effective lubricant can be stored in the cellular rubber annulus which is bonded to the porous metal. This can be accomplished by taking care to provide effective capillary communication between the porous metal and the rubber, as for example by limiting application of bonding cement used whereby portions of the porous metal periphery will have direct communication with pores of the rubber.

I claim:

1. A sealing device for establishing a fluid tight seal between relatively rotatable inner and outer parts having an annular space therebetween for receiving said sealing device, a pair of relatively rotatable interfitting metal rings having finished cylindrical surfaces in sealing apposition, said rings being disposed within said space, a resilient rubber annulus surrounding the outer ring and forming a fluid tight seal between the outer ring and the outer part, and a resilient rubber annulus surrounded by the inner ring and forming a fluid tight seal between the inner part and the inner ring, said annuluses enabling limited movement of both said rings in a radial direction.

2. A sealing device for establishing a fluid tight seal between relatively rotatable inner and outer parts having an annular space therebetween for receiving said sealing device, a pair of relatively rotatable interfitted metal rings having finished cylindrical surfaces in close sealing apposition, means forming a fluid tight seal between the outer ring and the outer part, said means including an annulus of resilient rubber surrounding the outer ring and bonded to the exterior periphery of the same, and means forming a fluid tight connection between the inner ring and the inner part, said last named means including an annulus of resilient rubber surrounded by the inner ring and bonded to the inner periphery of the same.

3. A sealing device for establishing a fluid tight seal between relatively rotatable inner and outer parts having an annular space therebetween for receiving said sealing device, said device comprising a pair of relatively rotatable interfitted metal rings having finished cylindrical surfaces in close sealing apposition, an outer metal mounting ring adapted to be disposed in said space in sealing engagement with the outer part, a second metal mounting ring adapted to be disposed in said space in sealing engagement with the inner part, an annulus of resilient rubber bonded to the exterior periphery of the outer one of said first named rings and extending outwardly in sealed engagement with the outer mounting ring, and another annulus of resilient rubber bonded to the inner periphery of the inner one of the first named rings and extending inwardly into sealed engagement with the inner one of the mounting rings.

4. A sealing device for establishing a fluid tight seal between relatively rotatable inner and outer parts having an annular space therebetween for receiving said sealing device, a pair of relatively rotatable interfitted porous metal rings having finished cylindrical surfaces in close sealing apposition, means forming a fluid tight seal between the outer ring and the outer part, said means including an annulus of cellular resilient material bonded to the outer ring, and means forming a fluid tight connection between the inner ring and the inner part, said last named means including an annulus of cellular resilient material bonded to the inner ring.

LAWRENCE G. SAYWELL.

REFERENCES CITED

The following references are of record in the file of this patent:

UNITED STATES PATENTS

| Number | Name | Date |
|---|---|---|
| 1,715,944 | Oliver | June 4, 1929 |
| 1,849,359 | Braden | Mar. 15, 1932 |
| 1,862,887 | Durdin | June 14, 1932 |
| 2,379,648 | Myers | July 3, 1945 |
| 2,380,222 | Curtis et al. | July 10, 1945 |